Figure 1:
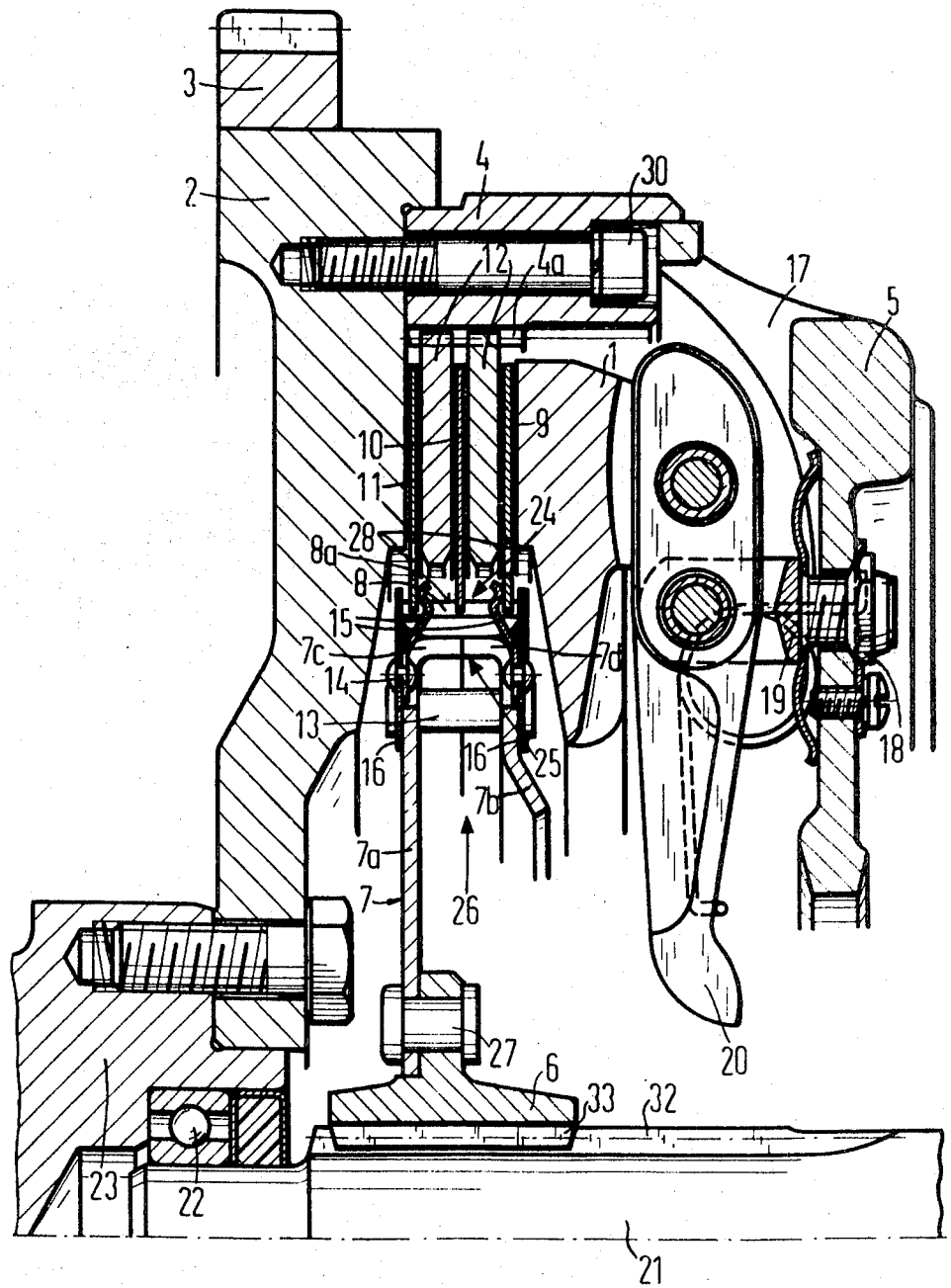

United States Patent
Riese

[15] 3,666,062
[45] May 30, 1972

[54] MULTIPLE-DISC FRICTION CLUTCH

[72] Inventor: Hans Walter Riese, Dittelbrunn, Germany

[73] Assignee: Fichtel & Sachs AG, Schweinfurt am Main, Germany

[22] Filed: Oct. 27, 1970

[21] Appl. No.: 84,396

[30] Foreign Application Priority Data

Nov. 27, 1969 Germany..................P 19 59 520.1

[52] U.S. Cl..................192/70.28, 192/70.2, 192/70.3
[51] Int. Cl..........................................F16d 13/56
[58] Field of Search................192/70.19, 70.2, 70.28, 70.3, 192/70.23, 107 CP; 188/70.3, 216

[56] References Cited

UNITED STATES PATENTS

| | | | |
|---|---|---|---|
| 1,848,843 | 3/1932 | Ruesenberg | 192/70.19 |
| 505,617 | 9/1893 | Twitt | 192/70.28 |
| 2,738,864 | 3/1956 | Becker | 192/107 CP X |
| 2,827,142 | 3/1958 | Aschauer | 192/70.28 X |
| 3,537,556 | 10/1968 | Pfeffer et al. | 192/70.28 |

FOREIGN PATENTS OR APPLICATIONS 905,019  3/1945  France.................192/70.28

*Primary Examiner*—Allan D. Herrmann
*Attorney*—Kelman & Berman

[57] ABSTRACT

The two terminal driven discs of a stack of driven and driving discs which directly engage the flywheel and the pressure plate in an otherwise largely conventional, multiple-disc, automotive friction clutch are held in forks distributed over the circumference of a hub assembly and each consisting of a rigid abutment and a leaf spring axially biasing the disc away from the other terminal disc and toward the abutment. This arrangement holds the terminal discs in well-defined axial positions in all clutch conditions and reduces the axial movement of the hub assembly during clutch engagement and disengagement, particularly when the springs exert greater biasing force on the terminal driven disc near the flywheel.

5 Claims, 2 Drawing Figures

MULTIPLE-DISC FRICTION CLUTCH

This invention relates to friction clutches suitable for use in the drive train of an automotive vehicle, and more specifically to multiple-disc friction clutches.

Known multiple-disc friction clutches, and particularly those of the wet type in which the driving and driven discs are cooled by a continuous stream of oil, require a much longer stroke of the pressure plate for engagement and disengagement of the clutch, and a corresponding movement of the hub assembly which carries the driven discs, than single-disc clutches. When a conventional multiple-disc clutch is disengaged, the axial positions of the hub assembly and of the driven discs are indeterminate and not reproducible. This makes the operation of the clutch inconvenient since the clutch pedal movement needed for full clutch disengagement may be significantly different each time the pedal is depressed.

It has been attempted to reduce the variations in clutch pedal movement by axially securing the hub assembly to the flywheel, but this arrangement requires complex and costly structural devices and a long stroke of the pressure plate and of the driven disc nearest the pressure plate.

The object of the invention is the provision of a multiple-disc clutch which avoids the shortcomings of the commonly used clutches of this type without resorting to costly and structurally complex devices and without requiring excessive axial movement of at least some driven discs which shortens the useful life of such discs.

According to a basic aspect of this invention, there is provided a positioning mechanism which moves the hub assembly and the driven discs, at least the two axially terminal driven discs, into respective predetermined and reproducible positions in the engaged and disengaged conditions of the clutch.

The positioning mechanism should move at least one of the driven discs into a predetermined and reproducible axial position relative to the hub assembly, this disc preferably being the one adjacent the pressure plate and remote from the flywheel which is the input member of the clutch.

Preferably, the positioning mechanism moves both terminal driven discs in the stack of driving and driven discs into respective predetermined and reproducible positions relative to the hub assembly, and springs are resorted to for bringing about the positioning movement of the driven discs in the disengaged condition of the clutch.

In its more specific aspects, the invention provides a plurality of forks associated with each terminal disc and circumferentially distributed on the hub assembly. Each fork consists of a rigid abutment and a spring fastened to each other and mounted on the hub assembly in a manner to receive the inner circumference of the associated driven disc, the spring biasing the associated disc away from the other terminal disc and toward the fastened abutment. In a wet-type clutch of the invention, the hub assembly is formed with openings for radial passage of a cooling fluid therethrough to the stack of discs, and the springs are arranged in respective passages.

Figure 2:
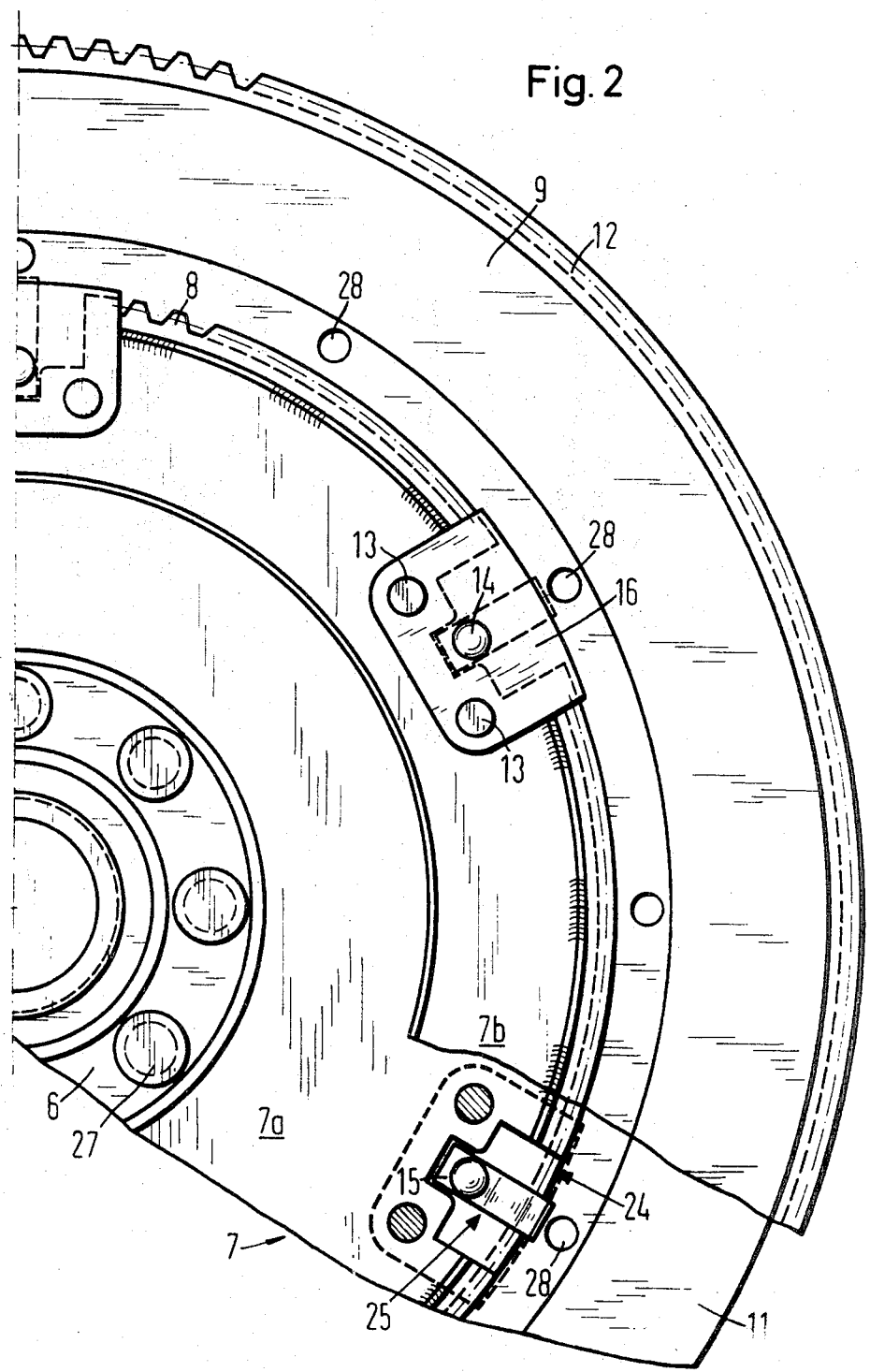

Other features, additional objects, and many of the attendant advantages of this invention will readily be appreciated as the same becomes better understood by reference to the following detailed description of a preferred embodiment when considered in connection with the appended drawing in which:

FIG. 1 shows one half of a clutch of the invention in section on its axis of rotation and of symmetry; and FIG. 2 shows internal elements of the clutch of FIG. 1 in an axial end view, portions being broken away for a better view of internal structure.

Referring now to the drawing in detail, and initially to FIG. 1, there is seen a wet-type, multiple-disc friction clutch for an automotive vehicle whose structure is partly conventional.

The illustrated clutch transmits torque from the crankshaft 23 of an engine, not otherwise shown, to an output shaft 21 which may be the main drive pinion of a gear transmission, not otherwise illustrated. The input element of the clutch is a flywheel 2 fixedly mounted on the crankshaft 23 and carrying a clutch housing 4 provided with a back plate 5. Two driving discs 12 are secured in the housing 4 against rotation and cooperate with driven discs 9, 10, 11 which are guided axially on a ring 8 mounted on a hub assembly having a hub proper 6 and a radial flange 7. The hub is secured against rotation on the output shaft 21.

The flywheel 2, the housing 4, and the back plate 5 are fixedly connected by screws 30. The stack of interengaged discs 9, 10, 11, 12 is normally compressed by a pressure plate 1, a set of non-illustrated pressure springs being arranged between the back plate 5 and the pressure plate 1 in the usual manner. The clutch is disengaged by moving the pressure plate away from the stack of discs and toward the back plate 5 against the restraint of the pressure springs by means of clutch release levers 20 distributed about the clutch axis and mounted on brackets 19 attached to the back plate 5 and axially adjustable by means of threaded bracket mountings and lock nuts 18.

The flywheel 2 is provided with a gear rim 3 on its outer circumference for engagement with a starter motor pinion, and has a flat, radial face opposite a friction facing on the driven disc 9. The output shaft 21 is journaled in a pilot bearing 22 in the crankshaft 23, and is provided with splines 32 for axially sliding engagement with grooves 33 in the hub 6. Rivets 27 connect the hub 6 to the flange 7. The structure described so far is known and its operation does not require detailed description.

The flange 7 is assembled from two elements 7a, 7b. The element 7a has a flat circular ring portion whose inner circumference is attached to the hub 6 by the rivets 27, as is also shown in FIG. 2. The peripheral portion of the element 7a is offset to form an integral axial flange 7c. The element 7b is also annular, but narrower than the element 7a. Its radially inner portion flares conically away from the element 7a, and its peripheral portion 7d is offset from the remainder of the element 7b to form an axial flange welded to the flange 7c along a circular butt seam. The elements 7a, 7b are additionally secured to each other by six pairs of shoulder rivets 13 whose reduced ends pass through conforming openings in the elements 7a, 7b, and whose enlarged central portions maintain the spacing of the elements.

The guide ring 8 has external, axially elongated teeth or ribs 8a and is welded to the radially, outer faces of the flanges 7c, 7d. Six openings 25 equiangularly spaced in the radial flange 7 and its flanges 7c, 7d are radially aligned with corresponding openings 24 in the ring 8 and the paired rivets 13. The driven discs 9, 10, 11 are formed with notches along their inner circumferences which receive the ribs or teeth 8a so that the driven discs 9, 10, 11 may slide axially along the guide ring 8 relative to the hub assembly while being coupled to the hub assembly and the output shaft 21 for joint rotation.

The two driving discs 12 are axially interposed between the driven discs 9, 10 and 10, 11 respectively and are connected to the clutch housing 4 by axial guide teeth or ribs 4a on the latter engaging notches in the outer circumferences of the discs 12 so that the discs 12 rotate about the clutch axis with the crankshaft 23, but are axially movable when the clutch is disengaged by withdrawal of the pressure plate 1.

Each pair of rivets 13 holds a pair of flat, rigid abutment plates 16 to respective radial faces of the flange elements 7a, 7b which are directed away from each other. A leaf spring 15 is attached to each plate 16 by a rivet 14 circumferentially interposed between the associated rivets 13. When in the relaxed condition, the springs 15 engage the plates 16. In the illustrated engaged condition of the clutch, the free end of each leaf spring 15 is deflected away from the corresponding plate 16 into one of the recesses 25 in the flange 7 by the inner periphery of a disc 9, 11 which is received between the radially outer, free ends of the springs 15 and plates 16, the ends projecting beyond the ribs or teeth 8a of the ring 8.

An oil pipe, not shown, extends axially into the clutch during its normal operation and discharges oil into the space bounded by the elements 7a, 7b and flanges 7c, 7d as indicated by an arrow 26. Centrifugal forces cause the oil to flow through the openings 25, 24 and to cool the friction facings of the discs 9, 10, 11, 12 before it is again discharged through passages 28 in the driven discs 9, 11 and gaps 17 in the back plate 5.

FIG. 2 shows the hub 6 and the clutch elements mounted thereon, a driving disc 12 being also indicated. The driven discs 9, 10 are partly broken away to show the disc 11 and an abutment plate 16 and spring 15 cooperating with the latter disc and mounted on the flange element 7a.

As is well known, a multiple-disc clutch requires a greater relative axial displacement between the flywheel 2 and the pressure plate 1 for clutch disengagement than an otherwise similar single-disc clutch. Because of the relatively long axial stroke of the pressure plate 1, the axial positions of the driven discs 9, 11 and of the hub 6 are indeterminate in the disengaged clutch in the absence of the springs 15 and the abutment plates 16. When the clutch is engaged, the hub 6 could move toward the flywheel 2 until the abutment plates 16 on the element 7b engage the driven disc 9 if only the springs 15 were absent. During subsequent clutch disengaging movement of the levers 20, the immediate release of the discs would be impeded by the fact that the hub 6 would have to move a relatively long distance in a direction toward the pressure plate 1 until the input and output members 2, 21 are fully disengaged from each other. It would have to move equally far in the opposite direction during engagement.

Because the driven discs 9, 11 are received in the forks formed by the springs 15 and abutment plates 16, the two axially terminal driven discs are moved axially away from each other during disengagement of the clutch by the springs 15 until they are held engaged with the abutment plates 16, and secured in this position, whereby the axial position of the hub 6 is also determined within close limits in a manner analogous to the operation of a single-disc clutch.

When the two sets of springs 15 act on the respective driven discs 9, 11 with the same axial force, and the clutch is engaged, the radial median plane of the flange 7 between the elements 7a, 7b coincides with the median plane of the disc stack 9, 10, 11, 12, and the spacing between the driven disc 9 and the abutment plates 16 near the pressure plate 1 is equal to the spacing between the pressure plate 1 and the abutment plates 16 near the flywheel 2. All springs 15 are equally stressed.

When the levers 20 are pivoted by a non-illustrated clutch release bearing to withdraw the pressure plate 1 from the stack of multiple discs, the driven disc 9 is immediately disengaged by the associated springs 15 from the opposite face of the near disc 12 and shifted into engagement with the abutment plates 16 near the pressure plate 1. Under the action of the cooling oil injected as indicated by the arrow 26, the two driving discs 12 and the central driven disc 10 are also moved toward the pressure plate 1 and away from each other. The driven disc 11 will be last to be disengaged from the flywheel 2 because it is being pressed against the engaging face of the flywheel by the cooperating springs 15, and the springs cause the hub 6 to be moved on the output shaft 21 toward the right, as viewed in FIG. 1, until the afore-described position of coinciding median planes is reached. The axial stroke of the hub 6 on the output shaft 21 is reduced to approximately one half of the stroke it would travel in the absence of the springs 15, and the position of the entire driven disc assembly between the flywheel 2 and the pressure plate 1 is well defined at all times.

If the springs 15 mounted on the flange element 7a are heavier or stronger than those mounted on the element 7b, the procedure described above is modified to the extent that the spacing between the driven disc 11 and the associated abutment plates 16 is smaller in the engaged clutch than that between the disc 9 and its plates 16. When the clutch is disengaged, the hub 6 moves a smaller axial distance than the path of the driven disc 9 on the guide ring 8. The movements performed by the hub 6 on the shaft 21 thereby are reduced to a distance not greater than that traveled by the driven disc in a single-disc clutch, and the problems arising in conventional multiple-disc clutches from the long stroke of the hub assembly carrying the driven discs are avoided.

The advantages of the invention are available to all clutches of the type described which have at least two driven discs mounted on a common hub assembly in such a manner that at least one driven disc may move axially on the hub assembly, while the disc 11 may be fixed, and are obviously available to clutches having more driven and driving discs than is specifically shown. It should be understood, therefore, that the foregoing disclosure relates only to a preferred embodiment of the invention, and that it is intended to cover all changes and modifications of the example of the invention herein chosen for the purpose of the disclosure which do not constitute departures from the spirit and scope of the invention defined in the appended claims.

What is claimed is:

1. In a multiple-disc friction clutch having an input member and an output member rotatable about a common axis, a hub element axially movable on the output member and secured thereon against rotation, a plurality of axially offset driven discs secured on said hub element against rotation, driving disc means axially interposed between said driven discs to constitute therewith a stack of discs, said driving disc means being secured to said input member for rotation therewith, said input member having a radial engagement face, pressure means axially spaced from said face for pressing said stack axially into frictional engagement with said face and for thereby engaging said clutch, a first driven disc being axially adjacent said face and remote from said pressure means, and a second driven disc being axially adjacent said pressure means and remote from said face, said first and second discs being axially movable on said hub element, and clutch disengaging means for releasing said pressure means, the improvement which comprises positioning means moving said first and second driven discs into respective predetermined and reproducible axial positions in the engaged and disengaged conditions of said clutch, said positioning means including two abutment means mounted on said hub element and associated with said first and second discs respectively, and yieldably resilient means respectively associated with said first and second discs and biasing the associated discs axially toward engagement with the associated abutment means, said yieldably resilient means being fixedly connected to the associated abutment means.

2. In a clutch as set forth in claim 1, said yieldably resilient means biasing the associated driven discs axially away from each other, the biasing force of the yieldably resilient means associated with said first driven disc being greater than the biasing force of the yieldably resilient means associated with said second driven disc.

3. In a clutch as set forth in claim 1, each yieldably resilient means including a plurality of spring members, each abutment means including a plurality of abutment members fixedly secured to respective spring members, each spring member and the associated abutment member jointly constituting a fork mounted on said hub element, open in a radially outward direction, and receiving the inner peripheral portion of the associated driven disc.

4. In a clutch as set forth in claim 3, said forks being substantially uniformly distributed about the inner circumference of each of said first and second discs.

5. In a clutch as set forth in claim 4, said hub element being formed with a plurality of openings for radial passage of cooling fluid therethrough to said stack, said spring members being arranged in said passages respectively.

* * * * *